United States Patent
Harper et al.

(10) Patent No.: US 6,594,784 B1
(45) Date of Patent: Jul. 15, 2003

(54) METHOD AND SYSTEM FOR TRANSPARENT TIME-BASED SELECTIVE SOFTWARE REJUVENATION

(75) Inventors: Richard Edwin Harper, Chapel Hill, NC (US); Steven Wade Hunter, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/442,003

(22) Filed: Nov. 17, 1999

(51) Int. Cl.[7] .......................................... H03K 19/003
(52) U.S. Cl. ............................. 714/47; 714/38; 714/15
(58) Field of Search ............................. 714/47, 38, 15, 714/13

(56) References Cited

U.S. PATENT DOCUMENTS

| | | | |
|---|---|---|---|
| 5,715,386 A | | 2/1998 | Fulton, III et al. |
| 5,748,882 A | * | 5/1998 | Huang ........................ 709/224 |
| 6,112,136 A | | 8/2000 | Paul et al. |
| 6,172,673 B1 | * | 1/2001 | Lehtinen et al. ............ 345/716 |

OTHER PUBLICATIONS

Huang, Yennun et al.; Software Rejuvenation: Analysis, Module and Applications; Jun. 27–30, 1995; Twenty–Fifth International Symposium on Fault–Tolerant Computing, 1995; FTCS–25 Digest Papers; p. 381–390.*

Gart, Sachin et al.; On the Analysis of Software Rejuvenation Policies; Jun. 16–19, 1997; 12th Annual conference on Computer Assurance, 1997; COMPASS '97 Are We Making Progress Towards Computer Assurance?; p. 88–96.*

Wang, Yi–Min et al.; Checkpointing and Its Applications; Jun. 27–30, 1995; Twenty–Fifth International Symposium on Fault–tolerant computing, 1995; FTCS–25 Digest Papers; p. 22–31.*

Tai, Ann T. et al.; On–Board Preventive Maintenance for Long–Life Deep Space Missions: A Model–Based Analysis; Sep. 7–9, 1998; IEEE International Computer Performance and Dependability Symposium 1998; IDPS '98 Proceedings; p 196–205.*

N.R. Draper et al., "Applied Regression Analysis", Second Edition, John Wiley & Sons, Inc., pp. 294–343, with Preface.

Vaidyanathan, Kalyanaraman, et al., "A Measurement–Based Model for Estimation of Resource Exhaustion in Operational Software Systems", Nov. 1–4, 1999; International Symposium on Software Reliability Engineering 1999 Proceedings; pp. 84–93.

Garg, Sachin, et al., "Analysis of Software Rejuvenation Using Markov Regenerative Stochastic Petri Net", Oct. 24–27, 1995; International Symposium on Software Reliability Engineering, IEEE, 1995, Proceedings; pp. 180–187.

* cited by examiner

Primary Examiner—Scott Baderman
Assistant Examiner—Joshua Lohn
(74) Attorney, Agent, or Firm—Gail H. Zarick, Esq.; McGinn & Gibb, PLLC (57) ABSTRACT

A method of enhancing software dependability, includes measuring an elapsed time in a software system running on a computer, determining whether the elapsed time matches a threshold, and when the elapsed time matches the threshold, rejuvenating at least a portion of the software system to reduce the likelihood of an outage and without modifying an application running in the software system.

28 Claims, 5 Drawing Sheets

METHOD AND SYSTEM FOR TRANSPARENT TIME-BASED SELECTIVE SOFTWARE REJUVENATION

CROSS-REFERENCE TO RELATED APPLICATION

The present application is related to U.S. patent application No. 09/442,001, filed on Nov. 17,1999, to Harper et al., entitled "METHOD AND SYSTEM FOR TRANSPARENT SYMPTOM-BASED SELECTIVE SOFTWARE REJUVENATION" having IBM Docket No. YOP999-449, assigned to the present assignee, and incorporated herein by reference.

BACKGROUND OF THE INVENTION

1. Field of the Invention

The present invention relates to software rejuvenation, and more particularly to transparent time-based selective software rejuvenation.

2. Description of the Related Art

The software executing in computer and networking systems can exhibit a behavior such that its failure rate increases over time, typically because of programming errors that generate increasing and unbounded resource consumption, or due to data corruption and numerical error accumulation (e.g., round-off errors). Examples of the effects of such errors are memory leaks, file systems that fill up over time, and spawned threads or processes that are never terminated.

The above-mentioned effects constitute a phenomenon known as "software aging," and may be caused by errors in either application, middleware, or operating system software. As the allocation of a system's resources gradually approaches a critical level, the probability that the system will suffer an outage increases. This may be viewed as an increase in the software system's failure rate. Such a software system failure may result in overall system failure, "crashing", "hanging", performance degradation, etc.

Figure 1:
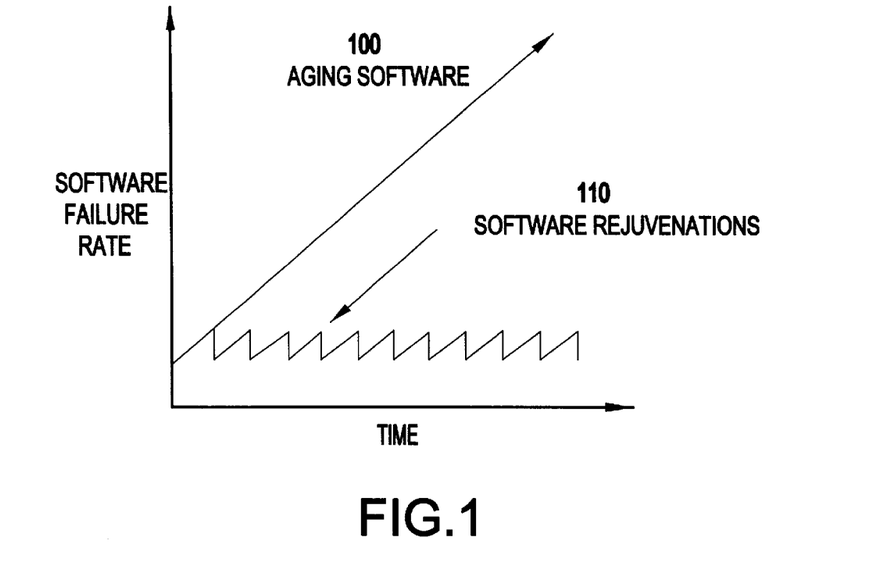
FIG. 1 is a diagram showing a relationship between the software failure rate over time.

One way of reducing the software's failure rate is to reset a portion of the system to recover any lost and unused resources. For example, this may be resetting just the application that is responsible for the aging, or it may be resetting the entire computer system. This is referred to as "software rejuvenation." When only a part of the system is selected for rejuvenation, this is called "selective rejuvenation." FIG. 1 is a diagram showing the relationship of the software failure rate over time. As shown software ages over time as shown by reference numeral 100, and the effects of software rejuvenations are shown at reference numeral 110.

When the part of the system that is undergoing aging is reinitialized via rejuvenation, its failure rate falls back to its initial (e.g., lower), level because resources have been freed up and/or the effects of numerical errors have been removed. This has a dramatic effect on overall system availability. However, when the failure rate begins to climb again due to the above-mentioned causes, subsequent rejuvenations become necessary.

The transparent nature of this function is partly achieved by being incorporated into a management framework separate and independent of the operating system and application. This approach not only assists in providing transparency, but also allows for portability and interoperability across multiple operating systems. This is important as it is becoming more common for systems management to span multiple platforms in the enterprise.

It should be noted that error-induced resource exhaustion is a fundamentally different phenomenon from performance-based capacity exhaustion. "Error-induced resource exhaustion" is due to the causes mentioned above and its effects can be eliminated temporarily by rejuvenation. "Performance-based capacity exhaustion" results from increases in performance requirements over time, and its effects can only be eliminated by reducing the computational performance requirements or adding new resources to the system.

In a conventional method and system, a time-based rejuvenation is performed within a single node and a multi-node environment. However, the conventional method and system assumes that the application must be modified to include calls to a fault tolerance library. Thus, modification of the application software source code is required. This is problematic because if the application source or executable code must be modified, then software rejuvenation technology cannot be applied to the broad class of applications for which the source or executable code cannot be economically modified, such as "shrink-wrapped" applications. Transparency (e.g., the lack of necessity to modify the application source or executable code) allows software rejuvenation to be applied to any application, regardless of whether the code can be modified or not. This extends its applicability to essentially all applications that can be executed on the computer system.

Additionally, the conventional method typically requires a proprietary dedicated system support for the rejuvenation functionality. Thus, the conventional methods and systems significantly restrict the rejuvenation's potential applicability and ease of use.

SUMMARY OF THE INVENTION

In view of the foregoing and other problems, disadvantages, and drawbacks of the conventional methods and structures, an object of the present invention is to provide a method and system for rejuvenating a software system.

Another object is to provide a system and method for rejuvenating a software system such that the rejuvenation is transparent to the user and such that modification may be performed from outside of the system.

In a first aspect of the invention, a method of enhancing software dependability is provided which includes measuring a time elapsed in a software system running on a computer, determining whether the time matches a threshold, and when the time matches the threshold, rejuvenating at least a portion of the software system to avoid or reduce the likelihood of an outage and without modifying an application running in the software system.

In a second aspect of the present invention, a method for software rejuvenation, includes waiting for a selected inter-rejuvenation interval to expire, determining whether a fail-to node has adequate resources to accept a failover workload, if the determining is that the fail-to node cannot accept the failover workload, sending an alert that adequate resources do not exist to support fault tolerance requirements, and suspending rejuvenation until an operator acknowledges and corrects the deficiency.

In other aspects of the invention, a system and signal-bearing medium storing the method are provided.

Thus, the present invention provides a time-based rejuvenation in several environments (e.g., the preferred embodiment being within a clustered environment). In the invention, the application need not be modified or to include calls to a fault tolerance library. Indeed, no such modification is necessary, and applications obtain the benefit of software rejuvenation without any modification. In addition, no proprietary, dedicated system support is required for the rejuvenation functionality. The use of rejuvenation by the present invention is performed within the context of any industry-standard clustering environment. These enhancements significantly expand rejuvenation's potential applicability and ease of use by incorporating its set-up and use within an already familiar management and operational infrastructure and not requiring the operator to use yet another framework.

Transparent Time-Based Selective Software Rejuvenation (TSR), according to the present invention, allows a system operator to cause selective software rejuvenation to be performed automatically, on a periodic basis, without operator intervention, and at a time which is least disruptive to system operation.

TSR is transparent to the application program. That is, no changes to the application software are required to obtain the benefits of TSR. When software rejuvenation is invoked within a cluster environment, the cluster fail-over services (i.e., Microsoft® Cluster Services or HACMP) may be used to "gracefully" stop the offending subsystem and restart it on the same or another node in the cluster, in a controlled manner. For purposes of the present application, "gracefully stopping" means terminating a program or operation in a pre-planned, purposeful manner such as closing out files properly and without any effect to any other subsystem or system performance.

With the unique and unobvious aspects of the present invention, unplanned outages due to resource exhaustion are avoided by periodically rejuvenating the software system. This benefit is provided transparently to the application software. Moreover, since the fail-over capabilities of a clustered system can be used, very little downtime is incurred to perform the rejuvenation. Further, an automatic and continual check on the system's capability to tolerate an unplanned failure can be performed.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF A PREFERRED EMBODIMENT OF THE INVENTION

Referring now to the drawings, and more particularly to FIGS. 2–9, there is shown a preferred embodiment of the method and structures according to the present invention.

Embodiment

Referring to FIGS. 2–9, an embodiment of the present invention will be described below.

First, prior to describing the preferred embodiment in detail, it is noted that although transparent software rejuvenation according to the present invention works well and provides benefits within the environment of a single stand-alone computer node, preferably the invention is implemented in the context of a cluster environment. Thus, as described below, the preferred embodiment will be described below within the context of a cluster environment, as shown in FIG. 2.

Figure 2:
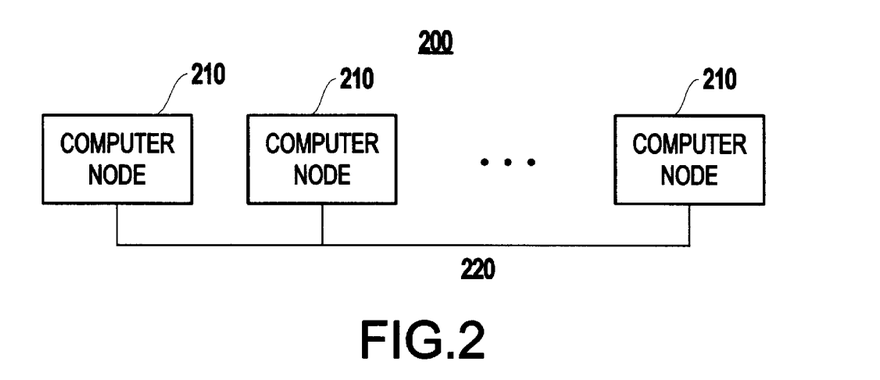
FIG. 2 is a schematic block diagram of a cluster environment.

For the purposes of the present invention (and as shown in FIG. 2), a cluster 200 can be regarded as a set of computer nodes 210, each of which contains an independent copy of the operating system, that are connected via a network 220 interconnect.

Any node 210 in the cluster 200 is capable of running the application program (e.g., a database or web serving application). The number of nodes 210 in a cluster 200 can range from two to hundreds, Hereinbelow, for ease of explanation and without loss of generality, the invention and its operation will be applied to a two-node cluster.

Typically, in a two-node cluster, a first node is designated the "primary node" and normally runs the application software, and a second node is designated as the "backup node" (e.g., secondary node) and is capable of running the application when the primary node fails. Distributed cluster management software running on both the primary node and the secondary node continually checks on the health of the primary node and its associated application software.

Figure 3:
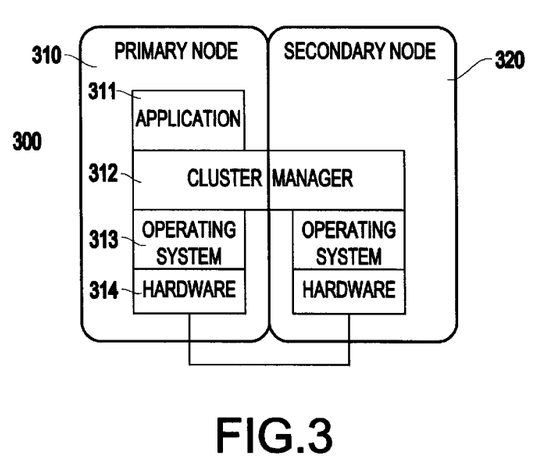
FIG. 3 illustrates software running on an industry-standard two-node cluster.
Figure 4:
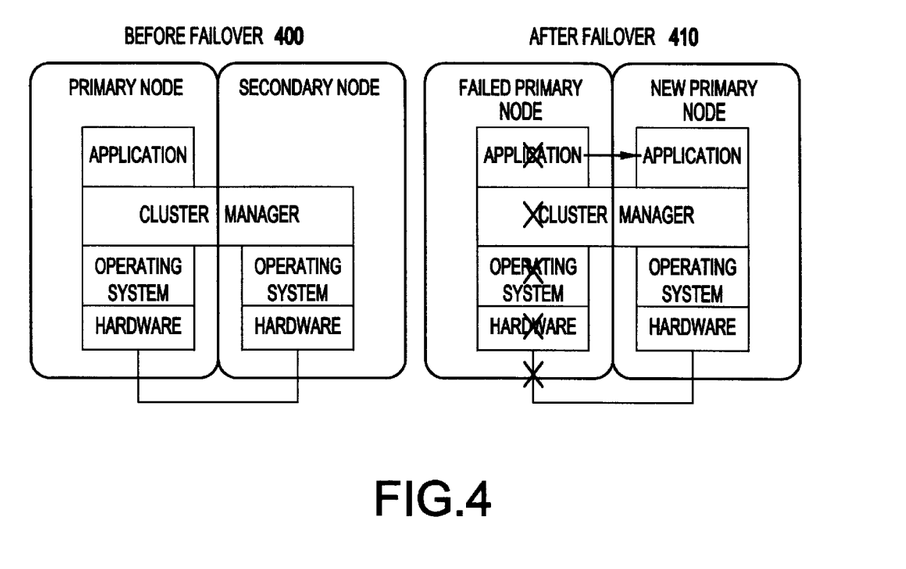
FIG. 4 illustrates failover on an industry standard two-node cluster, and more specifically cluster 400 illustrates before failover and cluster 410 illustrates after failover occurring.

As shown in FIG. 3 which illustrates software running on an industry-standard two-node cluster 300, if this cluster management software detects that any component or subsystem on the primary node 310 has failed (e.g., the application 311, middleware (not illustrated), cluster management software 312, operating system 313, or hardware 314), it causes the application to be restarted on the secondary node 320, thus providing a degree of fault tolerance. This process is called "failover," and the secondary node 320 is sometimes denoted the "fail-to" node. FIG. 4 illustrates failover on an industry standard two-node cluster. That is, cluster 400 illustrates before failover and cluster 410 illustrates after failover.

Several examples of clusters exist within the industry. For example, IBM® Corporation offers a version called HACMP® which is utilized in the IBM® AIX® operating system environment, and Microsoft® Corporation offers a version called Microsoft Cluster Server® which operates within the Microsoft Windows® NT operating system environment. The preferred embodiment of the present invention is independent of the type of the cluster environment, being equally applicable to clusters running UNIX, NT, or another operating system.

Generally, no modifications to the application source code are required for the applications to obtain the fault tolerance benefits of executing in a cluster environment. All the functionality required to detect the failure of an application or a computer node and restart the application on a secondary node resides within the cluster management software. The cluster management software exports interfaces that allow an external entity to trigger failover even when there is no fault. Transparent Time-Based Rejuvenation (and Symptom-Based Rejuvenation as described in the co-pending application) uses this interface to cause rejuvenation to occur. The Cluster Manager may be any of a number of off-the-shelf software packages commercially-available, for example, such as Netfinity Director®, with special features.

Transparent Time-Based Software Rejuvenation (TSR) according to the preferred embodiment of the present invention, is initiated by a system operator based on an experience-based estimate of the degree of aging experienced by a particular system and application.

Based on a system's history, the operator would know, for example, that a computer node if left to its own devices would be highly likely to suffer an unplanned failure due to resource exhaustion within one week of booting. Because unplanned failures are more disruptive and lengthy than planned outages, the operator prefers to preempt this unplanned weekly failure with may be more frequently occurring, but shorter planned outages. At system installation time or any time thereafter, the operator accesses a graphical user interface (GUI) to the rejuvenation functionality.

This user interface, for example, exposes a calendar-like menu which allows the operator to enable rejuvenation and select intervals for which rejuvenation is allowed to occur. The operator in the aforementioned scenario could, for example, use this interface to cause a planned rejuvenation to occur every predetermined time period (e.g., every four days) or at a particular time on a particular predetermined day of the week. The interface ensures that no two nodes in the cluster are to be rejuvenated at the same time, as the concurrent removal of two or more computer nodes from the cluster might cause the entire cluster to fail. Thus, the setup is where the user sets up the time base and its constraints and parameters.

Once this setup (e.g., shown in FIG. 5 as step 500A) is complete, periodic rejuvenation occurs automatically as described below.

Operation of the Present Invention

Figure 5:
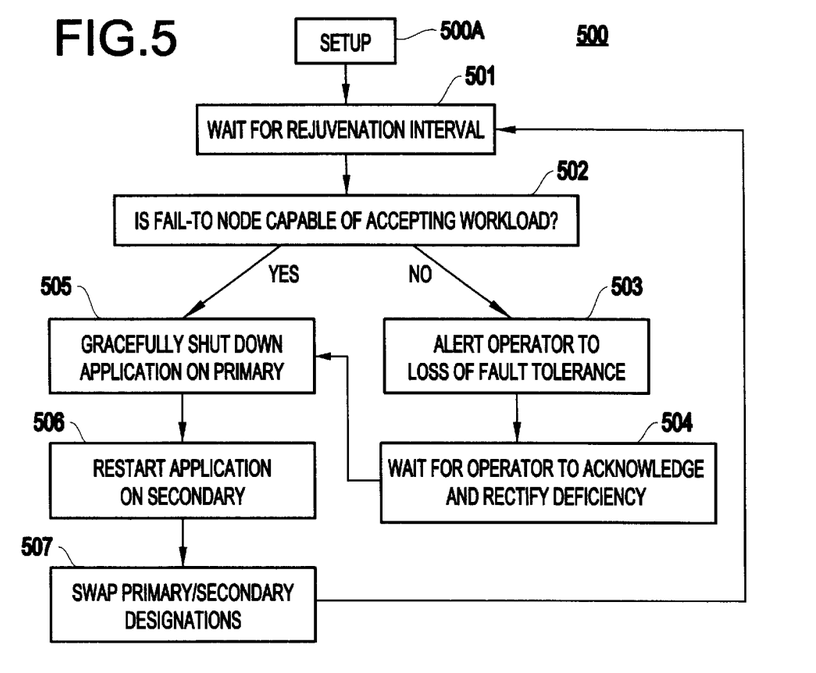
FIG. 5 illustrates a method 500 and logic flow for transparent time-based software rejuvenation (TSR) commencing with a preliminary setup step.

Referring to FIG. 5, the method 500 and logic flow for TSR is shown commencing with the setup step 500A assumed to have been run.

First, in step 501, the rejuvenation agent (RA) (e.g., preferably implemented in software and described in further detail below with regard to FIG. 7) waits for the selected inter-rejuvenation interval to expire. This step includes using a dedicated timer or the like (e.g., the system clock inputs) to determine a time elapsed.

Then in step 502, the rejuvenation agent determines whether the fail-to node has adequate resources to accept the failover workload. For example, the RA matches the workload to the available resources of the node, through an interface to a capacity management software or the like. If the determination is "NO", the process continues to step 503.

In step 503, after it has been determined that the fail-to node cannot accept the failover workload, the rejuvenation agent sends an urgent alert to the operator. That is, an urgent message is sent to the system management subsystem that adequate resources do not exist to support fault tolerance requirements. Such is conveyed to the operator via the GUI.

Thereafter, in step 504, the rejuvenation agent suspends rejuvenation until the operator acknowledges and corrects the deficiency.

If the determination in step 502 is "YES" (e.g., if the fail-to node can accept failover workload), then in step 505, the rejuvenation agent on the primary node instructs the cluster manager to gracefully (e.g., in a planned way) shut down the application on the primary node and in step 506 to restart the application on a secondary node.

In step 507, the cluster manager designates the old secondary node as the new primary node (e.g., swaps the nodes). This operation is performed by swapping resources from node to node (e.g., an address such as Internet Protocol (IP) address or the like), and the old primary node becomes the new secondary node. Thereafter, the process loops to step 501 and the rejuvenation agent waits for a rejuvenation interval to expire.

Figure 6:
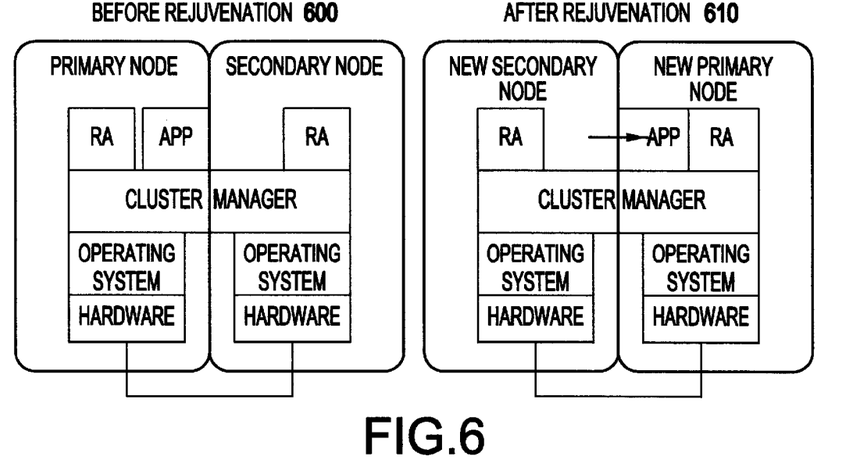
FIG. 6 illustrates a "successful" rejuvenation on an industry-standard two-node cluster, and specifically showing the cluster "before rejuvenation" 600 and the cluster "after rejuvenation" 610.

The above steps are illustrated in FIG. 6 showing a successful rejuvenation on an industry-standard two-node cluster. That is, FIG. 6 illustrates 'before rejuvenation" 600 and after rejuvenation" 610.

Figure 7:
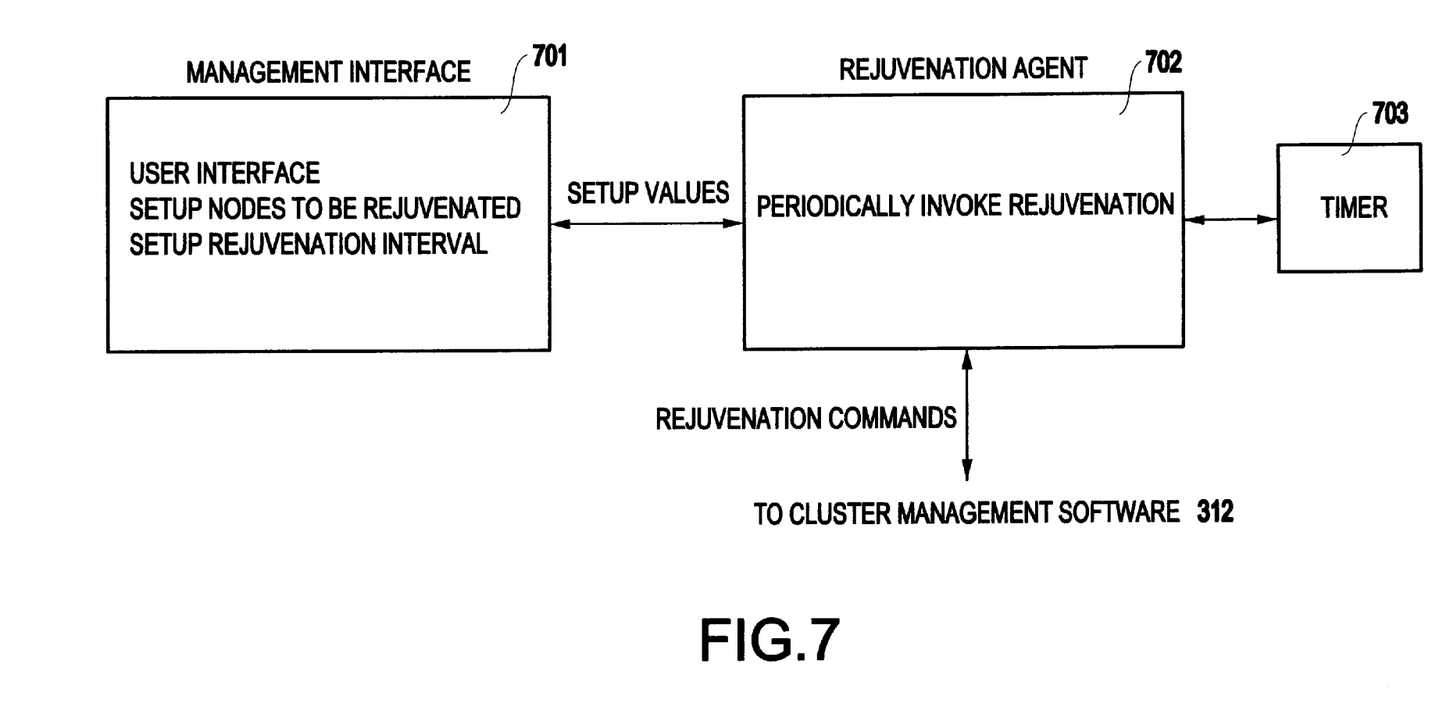
FIG. 7 is a schematic diagram showing a preferred architecture for a software rejuvenation system 700 according to the present invention.

FIG. 7 illustrates an exemplary functional architecture of the software components of the time-based software rejuvenation system 700 according to the present invention.

The system 700 includes a Management Interface component 701 which the system operator uses to set-up the time-based rejuvenation. Using this interface, the operator selects the nodes and subsystems that are to undergo rejuvenation and the time interval between rejuvenations for each system or subsystem to be rejuvenated.

As the operator is setting up the rejuvenation schedule, the Management Interface ensures that no two nodes or node subsystems in a cluster get rejuvenated at the same time unless specifically desired by the operator, to prevent the possibility of a system outage due to multiple simultaneous rejuvenations.

The Software Rejuvenation Agent 702 accepts this setup data at initialization time and whenever it is updated by the operator. The Rejuvenation Agent 702 sets up one timer 703 for each node to be rejuvenated, and subsequently based on the value of each timer 703 periodically causes the Rejuvenation Agent 702 to invoke the rejuvenation functionality interface as offered by the existing cluster management software.

Figures 8, 9:
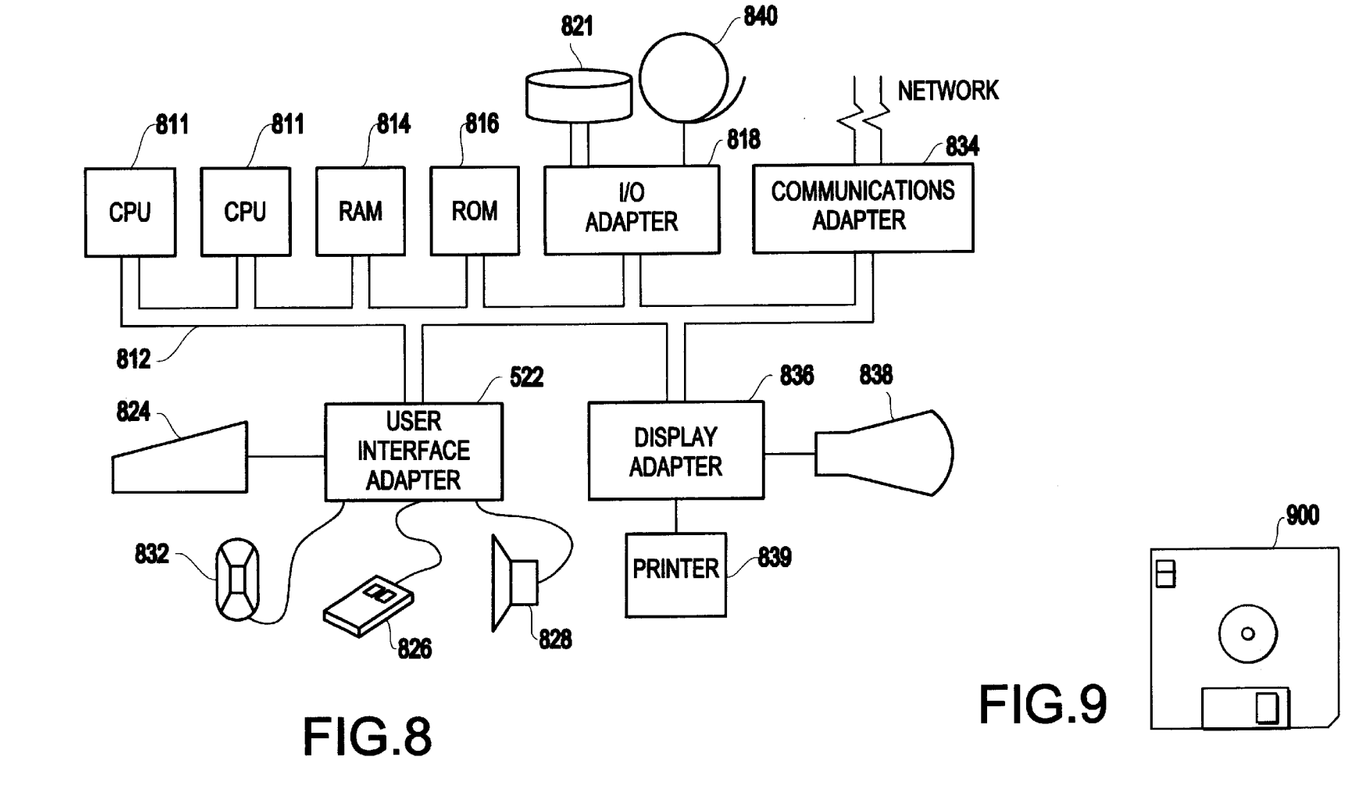
FIG. 8 illustrates an exemplary hardware/information handling system for incorporating the present invention therein.
FIG. 9 illustrates a signal bearing medium (e.g., storage medium) for storing steps of a program for software rejuvenation according to the present invention.

FIG. 8 illustrates a typical hardware configuration of an information handling/computer system in accordance with the invention and which preferably has at least one processor or central processing unit (CPU) 811.

The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communication adapter 834 for connecting an information handling system to a data processing network, the Internet, an Intranet, a personal area network (PAN), etc., and a display adapter 836 for connecting the bus 812 to a display device 838 and/or printer 839. As mentioned above, the printer 839 may be a digital printer or the like. A timer (e.g., not illustrated in FIG. 8 but shown in FIG. 7 as timer 703) is preferably operatively coupled to the CPUs 811.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Thus, as shown in FIG. 9 in addition to the hardware and process environment described above, a different aspect of the invention includes a computer-implemented method according to the present invention, as described above. As an example, this method may be implemented in the particular hardware environment discussed above.

Such a method may be implemented, for example, by operating the CPU 811 (FIG. 8), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 811 and hardware above, to perform the method of the invention.

This signal-bearing media may include, for example, a RAM contained within the CPU 811, as represented by the fast-access storage for example. Alternatively, the instructions may be contained in another signal-bearing media, such as a magnetic data storage diskette 900 (FIG. 9), directly or indirectly accessible by the CPU 811.

Whether contained in the diskette 900, the computer/CPU 811, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, TSR, according to the present invention, allows a system operator to cause selective software rejuvenation to be performed automatically, on a periodic basis, without operator intervention, and at a time which is least disruptive to system operation. The "time" may be gauged by a calendar provided to the user through a graphical user interface (GUI). "Least disruptive" may be determined dynamically or user-selected. The rejuvenation may be based on the time elapsed since the last rejuvenation, or it may be based on having completed a particular workload, such as a certain number of batch jobs.

TSR may be set up within the operator's normal system management console, where the operator may select rejuvenation of all or part of the system.

TSR is transparent to the application program. That is, no changes to the application software are required to obtain the benefits of TSR. When software rejuvenation is invoked within a cluster environment, the cluster management failover services (i.e., Microsoft(& Cluster Services or HACMP) may be used to "gracefully" stop the offending subsystem and restart it on the same or another node in the cluster, in a controlled manner. For purposes of the present application, "gracefully stopping" means terminating a program or operation in a pre-planned, purposeful manner such as closing out files properly and without any effect to any other subsystem or system performance.

Prior to invoking rejuvenation in the cluster case, TSR checks the "fail-to" node of the cluster to confirm that it has adequate resources (e.g., processor instruction execution throughput capacity, I/O bandwidth capacity, memory storage capacity, disk storage capacity) to accept the failed-over workload.

If the resource check fails, TSR informs the system operator that the failover cannot occur, alerting the operator of the system's inability to perform rejuvenation and, perhaps more significantly, its inability to tolerate an unplanned failure of the system to be rejuvenated.

Then, the operator can take corrective action to restore the system's fault resilience by performing actions such as adding processors, adding memory, adding I/O devices, adding storage, or perhaps rejuvenating the fail-to node in an attempt to free up resources consumed by aging on the fail-to node itself.

With the unique and unobvious aspects of the present invention, unplanned outages due to resource exhaustion are avoided by periodically rejuvenating the software system. This benefit is provided transparently to the application software.

Rejuvenation can increase a system's mean-time-to-outage by a factor of two or more (e.g., based on an analytical model), depending on the degree of aging. Once it has been set up, the rejuvenation process is completely automated and therefore not susceptible to human error, either in terms of forgetting to perform the rejuvenation, or in terms of errors in performing the rejuvenation itself.

Additionally, rejuvenation can be scheduled to occur at a time of least system workload, when an operator may not be present. Selective rejuvenation allows the operator to only rejuvenate that part of the system that is the cause of the aging, further reducing any impact on system operation. Because transparent rejuvenation requires no modifications to the application software, it can be used for any application running on the system, without modification.

Because the present invention can use the fail-over capabilities of a clustered system, very little downtime is incurred to perform the rejuvenation. Finally, the invention provides an automatic and continual check on the system's capability to tolerate an unplanned failure.

While a preferred embodiment of the present invention has been described above, it should be understood that it has been provided as an example only. Thus, those skilled in the art will recognize that the invention can be practiced with modification within the spirit and scope of the appended claims.

Having thus described our invention, what we claim as new and desire to secure by letters patent is as follows:

1. A method of enhancing software dependability, comprising:

measuring a time elapsed in a software system running on a computer;

determining whether said elapsed time matches a threshold; and when said elapsed time matches said threshold, rejuvenating at least a portion of said software system to reduce a likelihood of an outage and without modifying an application running in said software system.

2. A method for software rejuvenation, comprising:

waiting for a selected inter-rejuvenation interval to expire in a software system;

determining whether a fail-to node has adequate resources to accept a failover workload;

if said determining determines tat the fail-to node cannot accept the failover workload, then sending an alert that adequate resources do not exist to support fault tolerance requirements;

suspending rejuvenation until an operator acknowledges and corrects the deficiency; and rejuvenating said software without modifying an application running in said software system.

3. The method according to claim 2, further comprising:

if the determining determines the fail-to node can accept the failover workload, then a rejuvenation agent on a first node instructing a cluster manager to shut down an open application in a pre-planned manner on the first node; and restarting the application on a second node.

4. The method according to claim 2, further comprising:

if the determining determines the fail-to node can accept the failover workload, then a rejuvenation agent on a node instructing a cluster manager to shut down an open application in a pre-planned manner on the node; and subsequently restarting the application on said node.

5. The method according to claim 2, wherein said software rejuvenation is performed at an application software level.

6. The method according to claim 3, wherein said first node comprises a primary node and said second node comprises a secondary node, said method further comprising:

designating, by the cluster manager, the secondary node as a new primary node, and the primary node as a new secondary node.

7. The method according to claim 2, wherein said rejuvenation is performed in a clustered environment.

8. The method according to claim 2, wherein said rejuvenation is devoid of changing an application running on said system.

9. The method according to claim 2, further comprising:

automatically performing selective software rejuvenation, on a periodic basis, without operator intervention, and at a time which is deemed least disruptive to system operation.

10. The method according to claim 9, wherein said rejuvenation is performed based on one of a time elapsed since a last rejuvenation, and said system having completed a particular workload.

11. The method according to claim 10, wherein said rejuvenation is performed for one of a portion of said system and an entirety of said system.

12. The method according to claim 2, wherein said rejuvenation is performed transparently to an application program running on said system, such that no changes to an application software of said software system are required.

13. The method according to claim 2, wherein said rejuvenation is invoked within a cluster environment, and wherein cluster management failover services are used to controllably terminate one of an offending subsystem and an application software, and to restart said one of said subsystem and application software on a same or another node in the cluster.

14. The method according to claim 2, further comprising:

prior to invoking rejuvenation in the cluster, checking a fail-to node of the cluster to confirm whether said fail-to node has adequate resources to accept the failed-over workload.

15. The method according to claim 14, further comprising:

if the resource check fails, then informing a system operator that the failover cannot occur, and alerting the operator of the system's inability to perform rejuvenation.

16. The method according to claim 15, wherein said operator takes corrective action to restore the system's fault resilience by at least one of adding processors, adding memory, adding input/output (I/O) devices, adding storage, and rejuvenating the fail-to node to free up resources consumed by aging on the fail-to node.

17. The method according to claim 2, wherein said rejuvenation is performed, transparently to an application software of said system, based on measuring elapsed time, and by signaling to one of an operator and cluster management software to perform a planned rejuvenation.

18. The method according to claim 2, further comprising:

scheduling said rejuvenation to occur at a time of least system workload.

19. The method according to claim 2, further comprising:

selectively rejuvenating said system such that only that part of the system that is causing aging is rejuvenated.

20. The method according to claim 2, further comprising:

performing said rejuvenation without modifying an application software of said software system.

21. A method for software rejuvenation, comprising:

waiting for a selected inter-rejuvenation interval to expire in a software system;

determining whether a fail-to node has adequate resources to accept a failover workload;

if said determining determines that the fail-to node can accept the failover workload, then a rejuvenation agent on a primary node instructing a cluster manager to shut down an open application in a pre-planned manner on the primary node without modifying an application running in said software system; and restarting the application on one of the primary node and a secondary node.

22. The method according to claim 21, further comprising:

if said determining determines that the fail-to node cannot accept the failover workload, then sending an alert that adequate resources do not exist to support fault tolerance requirements; and suspending rejuvenation until an operator acknowledges and corrects the deficiency.

23. A system for increasing software dependability, comprising:

a timer for measuring an elapsed time in a software system running on a computer; and a management interface, coupled to said timer, for determining whether said elapsed time matches a threshold, wherein when said elapsed time matches said threshold, said management interface rejuvenates at least a portion of said software system to reduce the likelihood of an outage and without modifying an application running in said software system.

24. A system for software rejuvenation, comprising:
   a determiner for determining whether a fail-to node has adequate resources to accept a failover workload, upon expiration of an inter-rejuvenation interval; and
   a rejuvenation agent on a primary node instructing a cluster manager to shut down an open application in a pre-planned manner on the primary node, when said determiner determines that said fail-to node can accept the failover workload, said rejuvenation agent restarting the application on one of the primary node and a secondary node without modifying the application running on said primary node.

25. A system for enhancing software dependability, comprising:
   means for measuring a time elapsed in a software system running on a computer;
   means for determining whether said elapsed time matches a threshold; and
   means for rejuvenating at least a portion of said software system, when said elapsed time matches said threshold, to reduce a likelihood of an outage and without modifying an application running in said software system.

26. A signal-bearing medium tangibly embodying a program of machine-readable instructions executable by a digital processing apparatus to perform a method for computer-implemented dependability of software, said method comprising:
   measuring an elapsed time in a software system running on a computer;
   determining whether said elapsed time matches a threshold; and
   when said elapsed time matches said threshold, rejuvenating at least a portion of said software system to reduce the likelihood of an outage and without modifying an application running in said software system.

27. A signal-bearing medium tangibly embodying a program of machine-readable instruction executable by a digital processing apparatus to perform a method for computer-implemented dependability of software, said method comprising:
   waiting for a selected inter-rejuvenation interval to expire in a software system;
   determining whether a fail-to node has adequate resources to accept a failover workload;
   if said determining determines that the fail-to node cannot accept the failover workload, then sending an alert that adequate resources do not exist to support fault tolerance requirements;
   suspending rejuvenation until an operator acknowledges and corrects the deficiency; and
   rejuvenating said software without modifying an application running in said software system.

28. A signal-bearing medium tangibly embodying a program of machine-readable instructions executable by a digital processing apparatus to perform a method for computer-implemented dependability of software, said method comprising:
   waiting for a selected inter-rejuvenation interval to expire in a software system;
   determining whether a fail-to node has adequate resources to accept a failover workload;
   if said determining determines that the fail-to node can accept the failover workload, then a rejuvenation agent on a primary node instructing a cluster manager to shut down an open application in a pre-planned manner on the primary node without modifying the application running on said primary node; and
   restarting the application on one of the primary node and a secondary node.

* * * * *